ELECTROSTATIC AND MAGNETIC RECORDING METHOD

Filed June 1, 1964

INVENTOR.
ANDREAS G. MARKGRAF

BY Samuel Kane

ATTORNEY 3,441,938

ELECTROSTATIC AND MAGNETIC RECORDING METHOD

Andreas G. Markgraf, Phoenixville, Pa., assignor to Burroughs Corporation, Detroit, Mich., a corporation of Delaware Filed June 1, 1964, Ser. No. 371,468
Int. Cl. G01d 9/00
U.S. Cl. 346—1 3 Claims

ABSTRACT OF THE DISCLOSURE

A transfer drum is disposed between an electrostatic record drum and a pressure drum and is provided with a heating means for maintaining it at a substantially constant elevated temperature relative to the temperature of the record drum. Means is provided for printing electrostatically on the record drum and for developing the latent image with thermoadhesive pigmented ink in powder form. The heated transfer drum heats and transfers the inked image from the record drum to the transfer drum and then cooperates with the pressure drum for transferring the inked image to a record medium.

In a variation of the invention, the record drum is a magnetic drum and means is provided for magnetizing surface portions of the magnetic drum and for developing the latent image by applying magnetically attractable thermoadhesive pigmented ink to the magnetized regions. The inked image is then similarly heated and transferred by a heated transfer drum from the magnetic record drum to the transfer drum, and then the transfer drum similarly cooperates with a pressure drum for transferring the inked image to a record medium.

This invention relates generally to electrostatic and magnetic printing and more particularly to methods of, and apparatus for, printing electrostatically or magnetically on one record medium and transferring the printed information to another record medium.

In the electrostatic printing art, it has been customary to apply electrostatic charges to a special type of record medium composed of a layer of dielectric material bonded to an electrically conductive paper backing, and then to develop the latent image by bringing it into contact with pigmented ink in powder form. This type of record medium has been relatively expensive. Also, in the field of magnetic printing in which a powder image on a magnetized surface is transferred to a record medium, in certain cases the record medium has been given special treatment to impart to it powder fixing properties. This has been done in one case, for example, by coating the record medium with wax or paraffin prior to its use to enable it to hold the powdered ink, and in another case by spraying the record medium with a liquid during the printing process to obtain a more complete transfer of the powdered ink. These and other methods of specially treating the record medium likewise add to the cost of printing.

An object of the present invention, therefore, is to minimize the cost of electrostatic and magnetic recording by providing a method of and apparatus for recording which combine the high speed characteristics of electrostatic and magnetic recording with the economy of using ordinary paper or card stock as a record medium.

Another object of the invention is to provide an improved electrostatic and magnetic printing method and apparatus of novel procedure and design.

In accordance with the above objects and first considered briefly in its broad aspects, the invention comprises a method of, and apparatus for, preparing a master record surface with latent recording regions representative of information and capable of attracting and holding thermoadhesive pigmented ink in powder form, developing the latent image by applying such ink to the recording regions, moving the master record surface near to a transfer surface having a higher temperature than the master record surface and of such degree as to cause the ink to leave the master record surface and transfer and adhere to the transfer surface and become adhesive, and bringing the transfer surface into contact with a record medium having a greater affinity for the adhesive ink than the transfer surface to cause the adhesive ink to leave the transfer surface and adhere to the record medium.

The invention will be more clearly understood when the following detailed description of specific methods and embodiments thereof is read in conjunction with the accompanying drawings in which.

Figures 1, 3, 4:
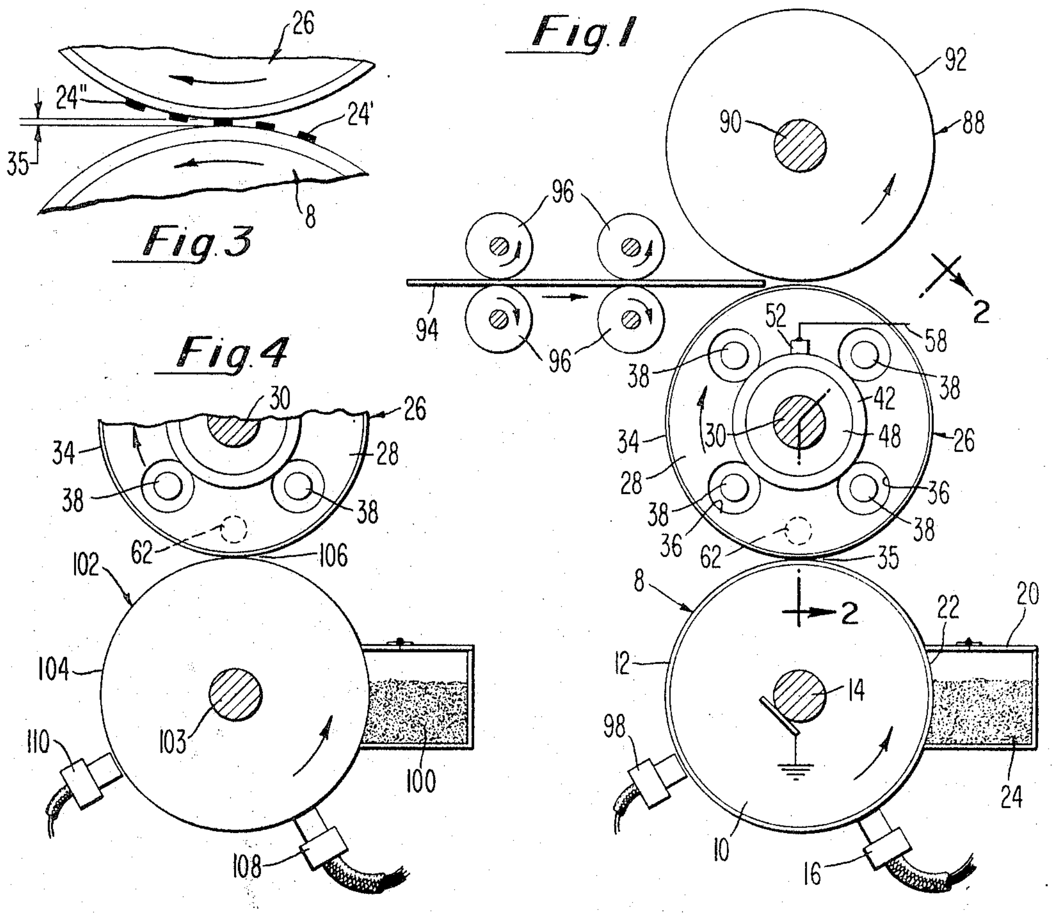
FIG. 1 is a diagrammatic illustration of an electrostatic printing apparatus constructed in accordance with the invention.
FIG. 3 is an enlarged view of fragments of a record drum and transfer drum, and illustrating the spacing therebetween.
FIG. 4 is a diagrammatic illustration of a modification for printing magnetically.
Figure 5:
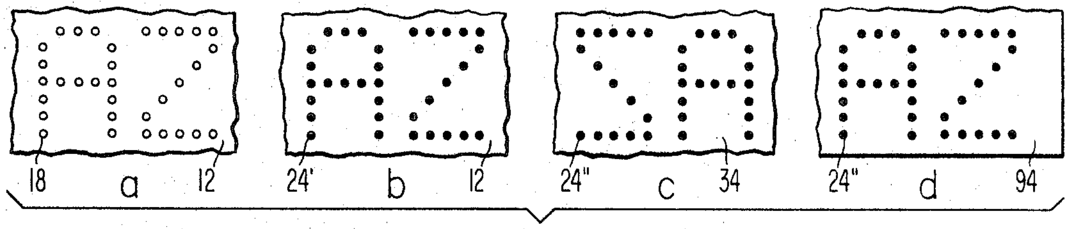
FIG. 5 illustrates successive steps in the process of printing and inking the master record medium and of transferring the inked image from the master record medium to another record medium.

Turning now to the detailed description and the accompanying drawings, the preferred embodiment of the apparatus of the invention for electrostatic printing is illustrated in FIG. 1 and comprises a record drum 8 which includes an electrically conductive cylinder 10 and a master record strip in the form of an endless band or layer 12 of dielectric material secured on the periphery of the electrically conductive cylinder 10, the latter connected to ground through its shaft 14 and constituting the back electrode for an accompanying print head 16. The print head 16 may, for example, be of the kind shown in U.S. Patent No. 2,966,894, issued in the name of Herman Epstein, in which case it would contain a matrix of pin electrodes, not shown, each pin electrode adapted to be energized for printing or impressing a latent electrostatic charge 18 (FIG. 5*a*) on the outer surface of the dielectric band 12 in accordance with predetermined patterns. For purposes of illustration, the patterns of charges 18, shown in FIG. 5*a*, are formed for recording the characters or letters A and Z, with each charge 18, while actually invisible, being shown as a visible circular region.

Adjacent to the record drum 8 is a container 20 provided with a discharge opening 22 for supplying developer to the surface of the dielectric band 12 in the form of finely divided electrically conductive pigmented ink particles 24 in dry powder form, and which become plastic and adhesive when suitably heated.

An electrically conductive thermoplastic ink which is thermoadhesive and satisfactory for use with the electrostatic embodiment of the present invention is described and claimed in a copending application of Charles P. West and Jacques Benveniste, Ser. No. 676,716, filed Aug. 7, 1957, now U.S. 3,166,510, entitled, "Electrographic Printing Ink," and assigned to the same assignee as the present invention.

Figure 2:
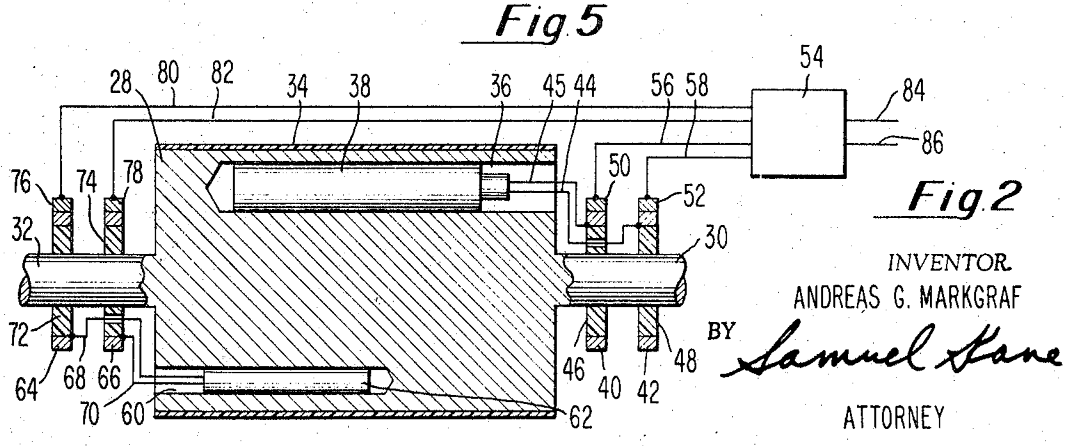
FIG. 2 is a sectional view taken along line 2—2 of FIG. 1 and showing additional details not shown in FIG. 1.

A transfer drum 26 comprises a heat-conductive cylinder 28 provided at its ends with shafts 30 and 32 (FIG. 2). Secured on the periphery of the cylinder 28 is an endless band or layer 34 of a fluorocarbon resin. A resin of this kind which has been found quite suitable for the present invention is manufactured by E. I. du Pont de Nemours and designated by that company as "Teflon," brands "TFE" and "FEP," respectively. The "TFE" brand is preferable because of its ability to withstand higher temperatures than the "FEP" brand. Because of the low heat conductivity of Teflon, the layer 34 is made to have a thickness of a few thousandths of an inch.

As shown most clearly in FIGURE 3, the transfer drum 26 and record drum 8 are separated to provide between their peripheries a gap 35 whose dimension is less than the depth of inking powder which is deposited on the dielectric 12 during the developing process, as will be described later on. The gap 35 prevents the transfer of a significant amount of heat from the transfer drum 26 to the record drum 8, while permitting the transfer drum to contact the ink on the record drum.

The cylinder 28 is provided with elongate openings 36 (FIG. 2) in each of which is secured an electrical cartridge-type heating element 38 for heating the transfer drum 26. Each heating element 38 is connected to electrically conductive commutator rings 40 and 42 as by means of an individual pair of wire conductors 44 and 45. The commutator rings 40 and 42 are fixed on electrically insulating discs 46 and 48, respectively, which are secured to the shaft 30. Slidably contacting the peripheral surfaces of the commutator rings 40 and 42, respectively, are electrically conductive brushes 50 and 52 which are connected to a heat controller 54 by means of wire conductors 56 and 58, respectively. Secured in an elongate opening 60 in the cylinder 28 is a thermistor-type temperature sensing element 62 which is connected to commutator rings 64 and 66 by means of wire conductors 68 and 70, respectively. The commutator rings 64 and 66 are fixed on electrically insulating discs 72 and 74, respectively, which are secured to the shaft 32. Slidably contacting the peripheral surfaces of the commutator rings 64 and 66, respectively, are electrically conductive brushes 76 and 78 which are connected, respectively, to the heat controller 54 by means of wire conductors 80 and 82. The heat controller 54 is connected to a source of electrical energy, not shown, by means of wire conductors 84 and 86.

Adjacent to the transfer drum 26 (FIG. 1) is a pressure drum 88 provided with a shaft 90 and having its peripheral surface 92 spaced from the periphery of the transfer drum 26 a distance slightly less than the thickness of the record medium 94, to be handled.

In the operation of printing electrostatically, the record drum 8, the transfer drum 26 and the pressure drum 88 are rotated by means of their respective shafts from a suitable source of power, not shown, and as indicated illustratively in FIG. 1 in this embodiment, the record drum 8 and pressure drum 88 are rotated in a counterclockwise direction and the transfer drum 26 is rotated in a clockwise direction. Through the medium of the heat controller 54, the heating elements 38, and the temperature sensing element 62, the transfer drum 26 is heated to a suitable temperature which is maintained substantially constant. A temperature range of 30°–400° F. has been found satisfactory, with best results obtained at a temperature of approximately 350° F.

As the record drum 8 rotates, it advances the master record or dielectric band 12 past the print head 16, where the dielectric band receives electrostatic printing in the form of the charges 18, and thence past the container 20 to enable particles of ink 24 to be attracted to the charges 18 to make the latent electrostatic image visible, as depicted in FIG. 5*b*. The darkened spots, or regions 24', indicated the adhesion of ink particles to the latent electrostatic charges.

When the inked region of the dielectric band 12 (FIG. 5*b*) reaches the gap 35 the particles of adhered ink 24' will come contact with the heated transfer drum 26 and become plastic and adhesive. Since the plastic ink has a greater affinity for the heated surface of the fluorocarbon resin layer 34 than for the relatively cold surface of the record drum 8, the plastic ink will be totally transferred to the layer 34, as depicted in FIG. 5*c* in which the transferred ink particles are designated by the numeral 24''. Thus when a record medium 94, which may be made of ordinary untreated paper or card stock, such as a tabulating card, is fed into the bite between the transfer drum 26 and the pressure drum 88 by delivery rollers 96, the plastic adhesive ink particles 24'' will adhere to the record medium 94 (FIG. 5*d*), and will thereby be pulled off the surface of the transfer drum 26. The transfer is accomplished at this stage by reason of the anti-sticking property of Teflon with respect to the plastic ink. In this connection, it is to be understood that while Teflon has proved to be most satisfactory for use with the present invention, other substances which can perform similarly at the two transfer points may be used.

It will now be apparent that a number of duplicate records on record media 94 may be obtained by repeatedly rotating the drums the required number of times. If it is desired to record new or different information on a record medium 94, an erase head 98 may be provided to remove the electrostatic charges from the dielectric surface 12, or to otherwise electrically neutralize these charges to condition the dielectric surface for receiving new printing from the print head 16.

FIGURE 4 shows a modification of the invention in another preferred form in which the invention is applied to magnetic printing, and in which the inking medium is a magnetically attractable pigmented powder 10. A rotatable record drum 102, provided with a shaft 103 and having a magnetizable peripheral master record surface 104, is spaced from the transfer drum 26 by a small gap 106, similar to the gap 35 shown in FIG. 3, and has associated with it a recording head 108 for writing magnetically on the surface 104 of the drum 102. The record drum 102 and recording head 108 may, for example, be similar to those shown in U.S. Patent No. 2,996,575, issued in the name of John C. Sims, Jr., and the recording head 108 may also be a multiple of the recording head shown in the Sims patent.

The magnetically attractable pigmented powdered ink 100 for use with the present invention must also be thermoplastic and thermoadhesive. An ink suitable for the present invention and having a desired particle size of −140 mesh can be made be first preparing: (1) a water dispersion out of 523 grams of magnetic iron oxide, (2) an emulsion out of 164 grams of vinyl plastic, and (3) a water dispersion out of 130 grams of lamp black. The dispersions and emulsion are then mixed, and the mixture spray dried. Some sieving may be necessary to obtain inking powder having the desired particle size of −140 mesh.

After information is recorded magnetically on the surface 104 of the record drum 102 by the recording head 108, the developing and transfer process to record the information on record media 94 is performed similarly to that described previously in connection with the electrostatic modification of FIG. 1. In the magnetic modification also, if it is desired to record new or different information on a record medium 94, an erase head 110 may be provided to demagnetize or to otherwise magnetically alter the surface 104 of the record drum 102 to condition it for receiving new magnetic printing from the recording head 108.

From the foregoing description, it will now be apparent that the present invention provides improvements in recording methods and apparatus whereby the high speed characteristics of electrostatic and magnetic recording may be combined advantageously with record media of ordinary paper or card stock.

While there have been disclosed specific methods and apparatus exemplary of the principles of the invention, it is to be understood that these are preferred forms of the invention, and that the invention may be constructed and practiced in a variety of shapes, sizes, modifications and methods without departing from the spirit and scope thereof. Accordingly, the invention is not to be limited by the specific structures and methods disclosed, but only by the subjoined claims.

What is claimed is:

1. A method of recording information comprising, preparing a first record surface with latent recording regions representative of information and capable of attracting and holding thermoadhesive pigmented ink in powder form, developing the latent image by applying such ink to the recording regions, moving said first record surface near to a transfer surface having a higher temperature than said first record surface of such degree as to cause the ink to leave the first record surface and adhere to said transfer surface and become adhesive, and contacting said transfer surface with a second record surface having a greater affinity for the adhesive ink than said transfer surface to cause the adhesive ink to leave the transfer surface and adhere to the second record surface.

2. A method of recording information comprising, preparing a first record surface with latent electrostatic charges representative of information and capable of attracting and holding electrically conductive thermoadhesive pigmented ink in powder form, developing the latent image by applying such ink to the charged regions, moving said first record surface near to a transfer surface so that the ink will contact the transfer surface, said transfer surface having a higher temperature than said first record surface of such degree as to cause the ink to leave the first record surface and adhere to said transfer surface and become adhesive, and contacting said transfer surface with a second record surface having a greater affinity for the adhesive ink than said transfer surface to cause the adhesive ink to leave the transfer surface and adhere to the second record surface.

3. A method of recording information comprising, producing a latent pattern of magnetized regions on a first record surface representative of information, developing the latent image by applying magnetically attractable thermoadhesive pigmented ink in powder form to the magnetized regions, moving said first record surface to bring the inked image into contact with a transfer surface, said transfer surface having a higher temperature than said first record surface of such degree as to cause the ink to leave the first record surface and adhere to said transfer surface and become adhesive, and contacting said transfer surface with a second record surface having a greater affinity for the adhesive ink than said transfer surface to cause the adhesive ink to leave the transfer surface and adhere to the second record surface.

References Cited

UNITED STATES PATENTS

| | | | |
|---|---|---|---|
| 2,990,278 | 6/1961 | Carlson. | |
| 3,052,564 | 9/1962 | Kulesza. | |
| 3,132,969 | 5/1964 | Seymour. | |
| 3,161,544 | 12/1964 | Berry | 346—74 |
| 3,255,695 | 6/1966 | Johnson | 101—426 |
| 2,060,801 | 11/1936 | Eichstadt | 101—154 |
| 2,735,364 | 2/1956 | Muller | 101—142 |

BERNARD KONICK, *Primary Examiner.*

LEE J. SCHROEDER, *Assistant Examiner.*

U.S. Cl. X.R.

346—74; 101—142; 118—637